United States Patent [19]

Brachet et al.

[11] Patent Number: 4,600,554
[45] Date of Patent: Jul. 15, 1986

[54] SECONDARY HEAT TRANSFER CIRCUIT FOR A NUCLEAR REACTOR COOLED BY A LIQUID METAL SUCH AS SODIUM, AS WELL AS A STEAM GENERATOR PARTICULARLY SUITABLE FOR SUCH A CIRCUIT

[75] Inventors: Alain Brachet, Orsay; Jacques Figuet, Aix en Provence; Joël Guidez, Connaux; Noël Lions, Manosque; René Traiteur, Ris Orangis; Thierry Zuber, Paris, all of France

[73] Assignees: Commissariat a l'Energie Atomique, Paris; Novatome, Le Plessis Robinson, both of France

[21] Appl. No.: 534,284

[22] Filed: Sep. 21, 1983

[30] Foreign Application Priority Data

Sep. 22, 1982 [FR] France ................... 82 15959

[51] Int. Cl.⁴ ............................................. G21C 1/02
[52] U.S. Cl. ................................. 376/307; 376/402; 376/404; 165/159; 122/32
[58] Field of Search .............. 165/159, 160; 376/307, 376/402, 403, 404, 405; 122/32

[56] References Cited

U.S. PATENT DOCUMENTS 3,628,507  12/1971  Saporiti.

FOREIGN PATENT DOCUMENTS 0014662  8/1980  European Pat. Off. .
2270661  5/1975  France .
2509841  1/1983  France .

Primary Examiner—Deborah L. Kyle
Assistant Examiner—Richard W. Wendtland

[57] ABSTRACT

The invention relates to a secondary heat transfer circuit for a liquid metal-cooled nuclear reactor, as well as to a steam generator which can be used in such a circuit.

According to the invention, a downstream buffer tank and an upstream buffer tank are arranged within the steam generator. The upstream buffer tank is annular and surrounds and communicates with an area of the generator by which the liquid metal flows downwards between the exchange zone and the discharge tube. The pressure of the neutral gas pocket in the downstream buffer tank is higher than that of the pocket of the upstream buffer tank.

Application to fast neutron nuclear reactors.

11 Claims, 5 Drawing Figures

SECONDARY HEAT TRANSFER CIRCUIT FOR A NUCLEAR REACTOR COOLED BY A LIQUID METAL SUCH AS SODIUM, AS WELL AS A STEAM GENERATOR PARTICULARLY SUITABLE FOR SUCH A CIRCUIT

BACKGROUND OF THE INVENTION

The present invention relates to a secondary heat transfer circuit for a nuclear reactor cooled by a liquid metal such as sodium, as well as to a steam generator particularly suitable for such a circuit.

In the present state of the art, fast neutron nuclear power stations conventionally comprise a primary circuit in which the sodium extracts the heat produced by the fuel elements of the core, in order to transfer it to a heat exchanger, in which it transfers its heat to sodium contained in a secondary heat transfer circuit. The hot sodium leaving the exchanger in said secondary circuit transfers the heat to a steam generator, where it gives up its heat to the pressurized water contained in a tertiary heat transfer circuit supplying steam to a turbine in order to produce electricity.

According to a so-called integrated reactor design, the primary heat transfer circuit is completely integrated into a vessel containing both the core of the reactor, the exchangers and the circulating pumps of the primary circuit, together with the liquid sodium contained in said circuit. As there are three or four heat exchangers the secondary heat transfer circuit outside the reactor vessel is usually divided into three or four identical loops, which also applies with respect to the tertiary heat transfer circuit.

In existing fast neutron nuclear power stations, the existence of a secondary heat transfer circuit is justified by the need of very safely confining the radioactive primary sodium and because it is necessary to protect the primary circuit from the possible repercussions of a leak from the heat exchange surface of the steam generator. Thus, in such a case, the pressurized steam or water would come into contact with the sodium and the chemical reaction produced is highly exothermic, releasing dangerous and corrosive reaction products (caustic soda and hydrogen). It is therefore necessary to protect the core, i.e. the primary circuit, from the possible repercussions of this sodium—water reaction (overpressure and pollution by sodium).

FIG. 1 shows the conventional construction of a secondary cooling loop of a fast neutron nuclear reactor. In the embodiment shown in continuous line form, this loop comprises a heat exchanger 4, whilst in the embodiment shown in broken line form, a further heat exchanger. The exchangers 4 are placed in vessel 2, sealed by a slab 3 and containing the reactor core 7 and the complete primary heat transfer circuit. More particularly, vessel 2 is filled with liquid sodium 5. The outlet from each exchanger 4 is connected to a steam generator 6 by an outgoing pipe 8. In the upper part of the steam generator, there is an argon pocket 6a, which defines the free sodium level N. The outlet of steam generator 6 is connected by a pipe 10 to the suction opening of a circulating pump 12, whereof each delivery opening is connected by a pipe 14 to the intake of an exchanger 4.

In such a conventional secondary cooling loop, the passage of the pump shaft is sealed by means of a mechanical packing, which is in contact with a neutral gas such as argon placed between the sodium and the packing. For this purpose, the free sodium level N1 is surmounted by an argon pocket 12a. Moreover, the pump rotor is placed in an expansion tank 18, whose size is adequate to absorb, without immersing the packing, all possible increases in the sodium volume in the secondary loop (by thermal expansion). Finally, in order to avoid any risk of the lining being immersed, which might occur in the case of an argon loop surmounting the sodium in tank 18, the latter is placed at the highest point of the circuit.

A pipe 20 for topping up with sodium connects a storage tank 24 placed in the lower part of the installation to the upper part of tank 18. This pipe 20 is equipped with a circulating pump 19 and a sodium purification system 21. It makes it possible to compensate any leak of the drain valve V2, which is positioned in the drain pipe 38 of pipe 10. Conversely, any inopportune rise in the free sodium level N1 of tank 18 is compensated by an overflow pipe 22, which connects tank 18 to pipe 36 below drain valves V1, located in the drain pipes 36 of pipes 8.

The argon pressure in tank 18 is controlled by an inlet tube 23, whilst the free sodium level N2 in tank 24 is surmounted by an argon covering 24a, whose pressure is controlled by a tube 26. Moreover, the argon coverings or pockets 6a, 12a of the generator and the pump communicate by both pipe 25 for balancing levels N and N1 and the pressures.

As is also illustrated in FIG. 1, tank 34 is also used for recovering any products resulting from a sodium—water reaction in the case of a leak in the steam generator 6. To this end, a pipe 30 connects the lower part of steam generator 6 to the upper part of tank 24. This pipe is normally sealed by large diameter bursting disks 28, which burst under the effect of overpressures due to the sodium—water reaction and thus permit the decompression of the secondary loop. In this case, tank 24 ensures the separation of the liquid and gaseous products resulting from the sodium—water reaction. However, this function can also be assured by a second separator 32, e.g. of the cyclone type, communicating with tank 24 by a pipe 31 and provided with a stack 34 for discharging to the atmosphere the gaseous products (hydrogen, argon, steam).

In addition to the means making it possible to recover the products of the sodium—water reaction which could take place in the steam generator, means are provided for damping shocks in the secondary circuit upstream and downstream of the steam generator, in order that they are not transmitted to the heat exchangers 4. Upstream of the exchange zone of generator 6, said means are constituted by the argon pocket 6a formed within the generator and in the upper part thereof. This argon pocket 6a then fulfils the function of an upstream buffer tank. Downstream of the generator, the downstream buffer tank coincides with the expansion tank 18 of the pump having the argon covering 12a. The prior art secondary loop described hereinbefore has a number of disadvantages mainly resulting from the need of placing the pump in the upper part of the installation and of positioning the pump rotor in a large-size expansion tank 18.

The raised position of the pump places it under poor hydraulic suction conditions, which make it necessary to adopt a low rotation speed and consequently a large diameter wheel and a slow drive motor to avoid cavitation. The assembly has large dimensions and is costly, because as is known the price of a pump increases with the square of its diameter. Parallel to this, the expansion tank surrounding the pump is heavy and expensive. Moreover, the combination of the weight of the pump—tank assembly and its arrangement in the upper part of the installation involves the use of a large support structure, particularly to obviate possible seismic effects, which tend to increase on increasing elevation. Moreover, bearing in mind the location of the different elements of the loop and the need to be able to empty these by gravity, the piping equipping the installation is particularly long and cumbersome. Finally, the arrangement of the expansion tank is such that it forms a system of vessels communicating with the steam generator. In the case of a sodium—water reaction in the latter, there are then large amplitude oscillations, which the expansion tank finds it difficult to contain.

In order to obviate these disadvantages, European Patent Application No. 0,014,662 proposes eliminating the expansion tank surrounding the pump and placing the latter in the lower part of the installation, just above the storage tank. This solution is made possible by introducing the storage tank into the active part of the secondary loop and by making it simultaneously serve as a downstream anti-water hammer tank and as an expansion tank. However, it makes it necessary to balance the sodium pressure throughout the secondary loop by placing under an adequate pressure the argon covering over the sodium in the storage tank. In practice, this pressure must be approximately 3 bars relative.

This known solution has the advantage of placing the pump under satisfactory hydraulic operating conditions, but the use of a pressurized storage tank, equipped with immersing pipes causes a significant increase in the risks resulting from the use of sodium as the cooling fluid. In particular, in the case of a leak in the circuit, the leakage flows are significantly increased and with them the risks of ignition of the atomized sodium. Among the other disadvantages of such a solution, reference is made to the impossibility of insulating the storage tank from the remainder of the circuit and the existence of transient phenomena of a difficult nature as a result of the reversal of the leakage flow direction in the pump. Moreover, it is certain that the multiplication of the functions fulfilled by the storage tank makes it particularly difficult to control thermohydraulic phenomena, which occur in said tank and the corresponding thermomechanical loading.

SUMMARY OF THE INVENTION

The present invention relates to a secondary heat transfer circuit not having the disadvantages of the hitherto known heat transfer circuits.

The invention therefore specifically relates to a secondary heat transfer circuit for a liquid metal-cooled nuclear reactor, comprising at least one heat exchanger located in the reactor vessel, a vertical steam generator outside said vessel, an outgoing pipe connecting an outlet tube of each heat exchanger to at least one intake tube of the steam generator, a return pipe connecting at least one outlet tube of the steam generator to an inlet tube of each heat exchanger, a pump for circulating a secondary liquid metal contained in said circuit and positioned in the return pipe, an upstream buffer tank and a downstream buffer tank disposed in said circuit respectively upstream and downstream of the exchange area of the steam generator, and a storage tank for the secondary liquid metal which can be linked with the remainder of the circuit, the steam generator having an outer envelope within which is arranged the upstream buffer tank, the latter defining a first free liquid metal level surmounted by a first neutral gas pocket above the exchange zone in the upper part of the envelope, wherein the downstream buffer tank is also arranged inside the outer envelope and defines a second free metal level surmounted by a second neutral gas pocket, said downstream buffer tank having an annular configuration and being positioned below the exchange zone, around an outlet zone from the generator by which the secondary liquid metal flows downwards between the exchange zone and the outlet tube of the steam generator, the downstream buffer tank communicating with said outlet zone, means being provided to establish a first neutral gas pressure above the secondary free liquid metal level in the downstream buffer tank, and means being provided for establishing a second neutral gas pressure, below the first neutral gas pressure, in simultaneous manner in the storage tank and in the upstream buffer tank.

As a result of these features, the expansion tank can be eliminated and the pump can be positioned in the lower part, without it being necessary to place the circuit under a high argon pressure and without the storage tank being introduced into the actual secondary loop. This leads to a considerable decrease in the overall dimensions and costs of the installation, to an improvement in the protection of the heat exchangers in the case of a sodium—water reaction in the steam generator and to satisfactory operating conditions with respect to the safety standpoint (low pressure), as well as for the operation of the pump.

In addition, the annular shape of the downstream buffer tank gives the liquid metal—tral gas interface a large surface area, which limits liquid metal level variations in said tank to a reduced fraction of the height of the steam generator. Thus, it is possible to achieve downstream damping outside the zone in which are located the expansion bends of the exchange tubes, which limits the risk of vibrations thereof.

In a first constructional variant of the invention, the circulating pump is a mechanical axial suction pump having a pump barrel and a motor controlling the rotation of a rotor in the pump barrel via a vertical shaft traversing a hydraulic packing integral with the pump barrel, the secondary liquid metal defining a free level surmounted by a neutral gas covering in that part of the pump barrel above the packing, said neutral gas covering being linked to means for establishing the second neutral gas pressure.

Preferably, the circuit then also comprises means for regulating the level of the secondary liquid metal in the pump barrel, said regulating means incorporating a supply pipe connecting the storage tank to the return pipe upstream of the main pump, a discharge pipe connecting an overflow formed in the pump barrel above the hydraulic packing to the storage tank, and means for permanently circulating the secondary liquid metal in said supply and discharge pipes, in order to be able to operate with a permanent secondary liquid metal leak through the hydraulic packing of the pump to the storage tank.

According to a second constructional variant according to the invention, the circulating is an electromagnetic pump.

The invention also relates to a steam generator for use in such a circuit, this generator is of the type having a vertically axed outer envelope, at least one inlet tube and at least one outlet tube for the secondary liquid metal, the space defined within the envelope being subdivided into a liquid metal intake zone communicating with the inlet tube, a liquid metal discharge zone communicating with the outlet tube and an exchange zone in which the secondary liquid metal circulates from top to bottom around the tertiary water circulating tubes between the intake zone and the discharge zone, the generator also having an upstream buffer tank formed by a first neutral gas pocket filling the upper end of the enclosure.

According to the invention, such a steam generator also comprises an annular downstream buffer tank, positioned below the exchange zone and communicating with the discharge zone by at least one opening formed at the lower end of its inner partition and whose tight upper part is filled with a second neutral gas pocket.

According to a special embodiment of the invention, the discharge zone of this generator is defined within a ferrule arranged coaxially in the lower part of the outer envelope, the downstream buffer tank being arranged around said ferrule in such a way that the lower part of the latter forms the internal partition of the tank, the lower end of the ferrule terminating at a given distance from the bottom of the envelope in order to define said opening.

According to a first variant, an annular passage is defined between the outer partition of the downstream buffer tank and the envelope, in such a way that there is a limited circulation of secondary liquid metal in the annular space defined around the ferrule and above the downstream buffer tank.

According to a second variant, the ferrule has at least one passage above the upper partition of the downstream buffer tank, in such a way that there is a limited circulation of secondary liquid mtal in the annular space defined around said ferrule, above the downstream buffer tank.

BRIEF DESCRIPTION OF THE DRAWINGS

The invention is described in greater detail hereinafter relative to non-limitative embodiments and with reference to the attached drawings, wherein show.

DETAILED DESCRIPTION OF THE INVENTION

Figure 2:
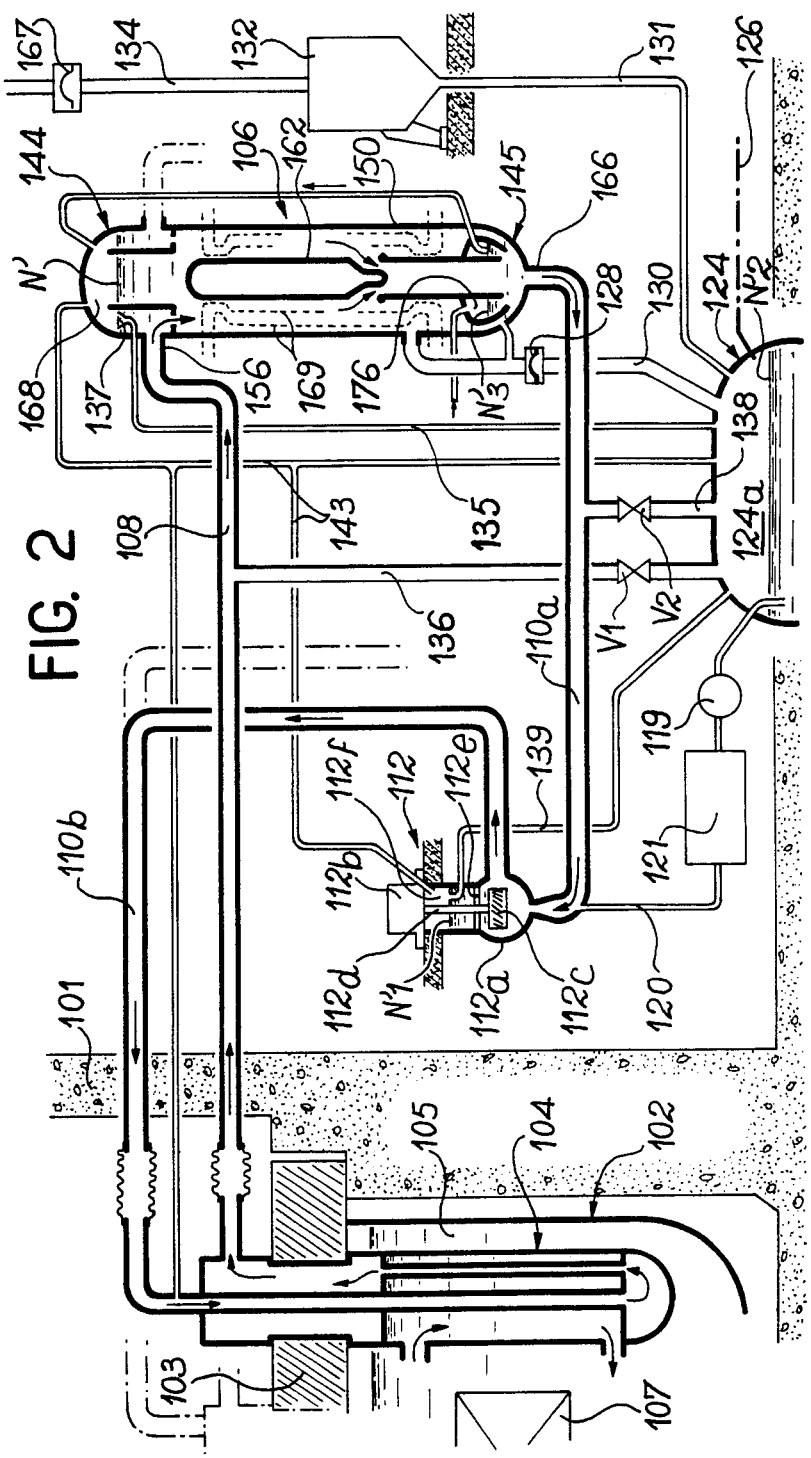
FIG. 2 a comparable view to FIG. 1 showing a loop of a secondary cooling circuit according to the invention.

FIG. 2 shows in simplified form a secondary circuit loop according to the invention. It is more particularly possible to see part of the reactor building 101, on which rests a slab 103 supporting and sealing the reactor vessel 102. Vessel 102 is filled with primary liquid metal 105 and in per se known manner contains the complete primary circuit of the reactor. FIG. 2 more particularly shows within the main vessel 102, the core 107 of the reactor, as well as the heat exchangers 104 used for transmitting the heat extracted from the core by the primary sodium 105 to the sodium circulating in the secondary circuit. In general, the heat exchangers 104 are suspended on slab 103 in such a way that the assembly of the exchange zone is immersed in the primary sodium 105 and only the head of the exchangers is positioned above the slab.

Outside building 101, the secondary loop shown in FIG. 2 essentially comprises in per se known manner a vertical steam generator 106 and a circulating pump 112. The outlet tube of the head of exchange 104 is connected to the secondary sodium intake tube 156 of steam generator 106 by an outgoing pipe 108. The secondary sodium introduced in this way into the steam generator circulates within envelope 150 up to an outlet tube 166, located at the lower end of the envelope. During this travel and as will be shown in greater detail hereinafter, the secondary sodium passes between a large number of helical exchange tubes such as 169, in which circulates from bottom to top the pressurized water of a not shown water—steam tertiary circuit. The water circulating in the latter circuit is consequently vaporized and drives turbines controlling an electric current generator.

The thus cooled secondary sodium leaves steam generator 106 via tube 166 and returns by a two-part return pipe 110a, 110b to the intake of the head of exchanger 104. More specifically, part 110a of the return pipe links the outlet tube of the steam generator to the suction opening of an axial suction hydraulic pump 112 and the second part 110b of the return pipe links the delivery opening of the pump to an intake of the head of exchanger 104.

Obviously and as shown by broken lines in FIG. 2, several exchangers 104 can be incorporated into the same loop of the secondary circuit. The number of pipes 108, 110b is then multiplied by this number of exchangers.

Still in per se known manner, the secondary circuit also has a storage tank 124, positioned in the lower part of the installation so that it can receive by gravity all the sodium contained in the secondary circuit. Therefore, the lower point of pipe 108 is connected to tank 124 by a pipe 136 and the low point of pipe 110a is connected to tank 124 by a pipe 138, each of the pipes 136, 138 being controlled by a valve V1, V2 respectively.

In order to permit the filling of the secondary circuit, when the latter is completely contained in storage tank 124, there is provided a supply pipe 120, whose lower end is immersed into the sodium contained in tank 124 and whose upper end issues into pipe 110a, in the vicinity of the suction opening of pump 112. The sodium circulation in pipe 120 is realised by means of a pump 119, which is generally of the electromagnetic type. Pipe 120 also contains purification means 121, which can e.g. be formed by a random known cold trap.

The sodium contained in storage tank 124 defines a free level N'2, surmounted by a covering 124a of inert gas, such as argon. The pressure of this argon covering is regulated by means of a pipe 126, so as to maintain the argon pressure in tank 124 at a low level, e.g. approximately 0.5 bar relative, no matter what the operating conditions.

In a comparable manner, the sodium contained in the steam generator envelope 150 is surmounted by an inert gas pocket 168, such as an argon pocket above the actual exchange zone, so as to define a free level N'. Level N' is between two levels, namely an upper level N'$_s$ corresponding to the overflow 137 and a lower level N'$_i$ positioned above the inlet tubes 156. The free level is regulated by means of a pipe 135 connecting the overflow 137 within steam generator envelope 150 to the upper part of tank 124.

In the embodiment of FIG. 2, pump 112 is a mechanical pump having a pump barrel 112a, a drive motor 112b and a rotor 112c driven by the motor by means of a vertical shaft 112d. Shaft 112d traverses essentially at mid-height of the pump barrel, a hydraulic packing 112e constituted by a labyrinth, permitting a controlled liquid sodium leak from the active part of the pump constituted by the rotor located below the packing 112e to the area of barrel 112a positioned above said packing, whilst ensuring a certain insulating between these two areas. Above packing 112e, the liquid sodium defines its free level N'1, surmounted by a pocket of inert gas 112f, such as argon.

Level N'1 is permanently maintained at a substantially constant value both by means of pipe 120 which, through the operation of pump 119, is able to operate with a permanent sodium leak through packing 112e so as to prevent any unwatering of the pump, and by means of a pipe 139, which connects an overflow within the pump barrel to tank 124. Bearing in mind the pressure loss at the packing 112e, there is also a separation between the sodium in the actual second circuit and the sodium in the pump barrel above the packing. This important feature of this embodiment of the invention using a mechanical pump makes it possible to position the latter at any random level and particularly at a relatively low level (close to the lower end of the steam generator), as shown in FIG. 2.

The circuit formed by the supply pipe 120 of pump 119 and the overflow pipe 139, makes it possible to ensure the slow expansion of the sodium, by using the sodium reserve contained in storage tank 124.

The atmospheres of the large volumes constituted by the argon covering 124a of the tank, 106a of the steam generator and 112f of the pump are pressure balanced by means of connecting pipes 143. When the pressure established in the argon covering of storage tank 124 is e.g. 0.5 bar relative, the same applies with respect to the pressure prevailing in the argon coverings of the steam generator and the pump. It should be noted that the low pressure established in this way in the complete secondary circuit according to the invention makes it possible to significantly improve the safety thereof, whilst retaining for pump 112 particularly good hydraulic characteristics resulting from the arrangement thereof at a relatively low point of the installation.

Figure 1:
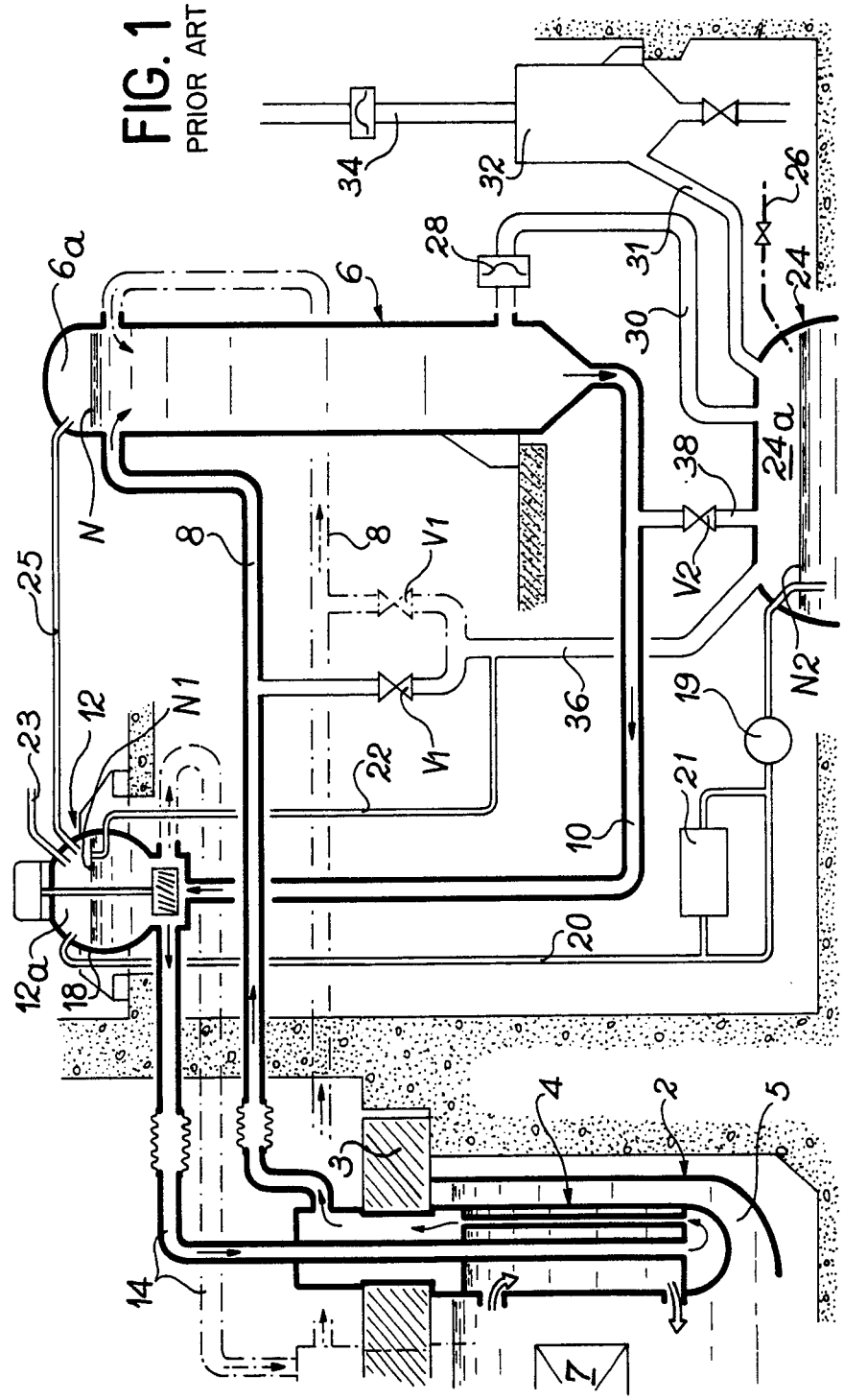
FIG. 1, already described, diagrammatically a loop of a secondary cooling circuit of a fast neutron nuclear power station in accordance with the prior art.

Bearing in mind the overpressure of the expansion tank surrounding the pump in the prior art circuits (FIG. 1) and in order to prevent the transmission to exchangers 104 of pressure waves which could result from a possible sodium—water reaction in steam generator 106, upstream and downstream of the exchange area thereof are provided buffer tanks which, according to the invention, are arranged as close as possible to said exchange area, in order not to produce large amplitude oscillations as a result of such shocks.

In per se known manner, the upstream buffer tank 144 is constituted by the inert gas pocket 168 enclosed in the dome of the steam generator envelope 150, above the free sodium level N'. Therefore, the height of the argon pocket is calculated in such a way that it can absorb the shock resulting from a sodium—water reaction in the steam generator.

According to the invention, the downstream buffer tank 145 is also arranged within the steam generator envelope 150, between the actual exchange zone and the outlet tube 166. In addition, buffer tank 145 has an annular shape, in such a way that the liquid sodium flows downwards within its inner partition. This annular configuration of tank 145 gives the sodium a large free surface within the tank. Thus, variations of the sodium level in the downstream buffer tank are relatively limited, when the pressure waves are produced by a sodium—water reaction within the steam generator. The damping of the pressure waves can thus be realised at a relatively limited height of the steam generator, both upstream and downstream thereof. This feature is essential, because it makes it possible to carry out this damping action at a level of the generator differing from that at which the expansion bends of tubes 169 are located. This makes it possible to prevent vibration of these tubes and the possible fracture risk resulting therefrom.

Over and above the said upstream and downstream buffer tanks, in a conventional manner the products resulting from a possible sodium—water reaction in the steam generator can be evacuated. To this end, a pipe 130 connects the steam generator to the upper part of storage tank 124, which then acts as a separator between the liquid and gaseous products. Pipe 130 is normally sealed by disks or diaphragms 128 having a large cross-section, which burst in the case of an overpressure. In the hypothesis that tank 124 is inadequate to carry out the separation of the liquid and gaseous effluents, the upper part thereof is connected to a separator 132 by a pipe 131. The gaseous effluents leaving separator 132 are discharged into the atmosphere by a stack 134. Conversely, the liquid effluents drop back down again into tank 124. A diaphragm 167 makes it possible to keep stack 134 and separator 132 under a neutral gas.

In exemplified manner, FIGS. 3 to 6 show in greater detail various embodiments of the steam generator 106 according to the invention.

Figure 3:
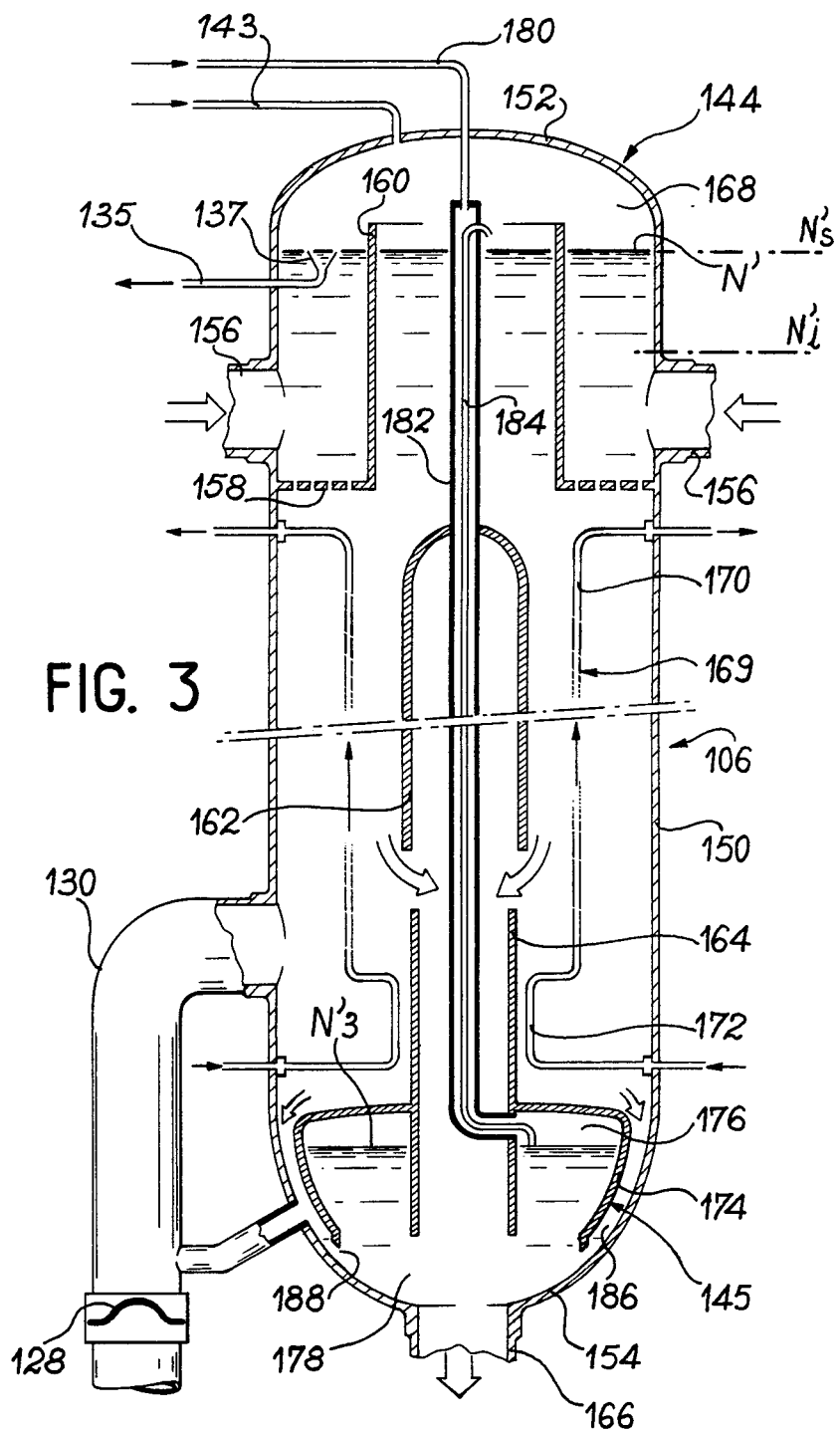
FIG. 3 a first constructional variant of a steam generator for use in the circuit of FIG. 2, having a downstream buffer tank arranged in the lower part, around a ferrule carrying the liquid sodium to the outlet tube.

Thus, FIG. 3 shows a steam generator 106 having a vertically axed cylindrical envelope 150, whose upper end is sealed by a dome 152 and whose lower end is terminated by a base portion 154. Secondary sodium enters laterally in the upper part of envelope 150 by means of one or more tubes 156 (as a function of whether there are one or more exchangers 104 in the secondary loop).

The sodium entering the generator is deflected downwards through a distribution grid 158 by a ferrule 160 arranged coaxially to envelope 150 facing tubes 156. The secondary sodium consequently flows from top to bottom in an annular space made between the cylindrical envelope 150 and a central core 162 arranged coaxially within the envelope. The sodium then enters a ferrule 164 arranged below core 162, which is also coaxial to envelope 150 and then leaves the steam generator by an outlet tube 166, which opens into the bottom end 154 of the envelope, in accordance with the vertical axis of the latter, i.e. in the extension of ferrule 164.

The steam generator 106 of FIG. 3 also has a bundle of tubes 169 in which circulates the water of the water—steam tertiary circuit. Each of the tubes 169 has a helical part 170 arranged in the annular space defined between envelope 150 and central core 162. This part of the tubes is immersed in the secondary liquid sodium flowing from top to bottom between grid 158 and ferrule 164. Thus, it defines the actual exchange zone of the steam generator, in which the heat carried by the secondary sodium is transmitted to the water of the tertiary circuit, which has the effect of converting it into superheated steam.

Each tube 169 of the bundle has, below its helical heat exchange zone 170, a portion 172 in the form of an expansion bend. Portion 172 is positioned in the annular space defined between envelope 150 and ferrule 164, i.e. outside the secondary sodium outflow zone. Thus, it does not form part of the actual exchange zone of the steam generator.

In order to facilitate the heat exchange between the secondary sodium and the tertiary water and the vaporization of the latter, the water circulates from bottom to top in tubes 169 in countercurrent with respect to the sodium.

As was stated hereinbefore, the upstream buffer tank 144 is constituted by an argon pocket 168 filling the dome 152 of the generator envelope, in order to define under normal operating conditions a liquid sodium level N' above the inlet tubes 156. Thus, tank 144 is located in the area where the liquid sodium enters envelope 150. It therefore ensures the damping of the pressure waves produced by a possible sodium—water reaction in the exchange zone upstream thereof.

It has been stated hereinbefore that the argon pocket 168 communicates with the argon pocket 124a of the storage tank and with the argon pocket 112f of the pump by a pipe 143. In the same way, the sodium level N' has an overflow 137 connected by a pipe 135 to the storage tank.

The volume variations due to rapid transitions are compensated by the seal volume placed at the top of steam generator 106 and by the overflow pipe 135.

According to the invention, the downstream buffer tank 145 is also placed within the steam generator envelope 150, at a level which is staggered relative to the expansion bends 172 of the tubes.

To this end, in the embodiment of FIG. 3, tank 145 is positioned in the lower part of envelope 150, below expansion bends 172. It has an annular shape and is positioned between the bottom 154 of the envelope and the lower part of ferrule 164. More specifically, tank 145 has a bell-shaped metal sheet 174, sealingly fixed to ferrule 164, in such a way that sheet 174 defines the upper wall and outer side wall, whilst the lower part of ferrule 164 defines the inner side wall of annular tank 145.

Thus, the upper part of tank 145 is tight and is filled by an argon pocket 176. Conversely, the lower end of ferrule 164 is positioned at a certain distance from the bottom 154 of the envelope, so as to define a passage 178 by which the liquid sodium is admitted into tank 145 up to a level N'3 below the argon pocket 176. Thus, tank 145 is located in the liquid sodium discharge zone within envelope 150. It therefore ensures the damping of the pressure waves produced by a possible sodium—water reaction in the exchange zone downstream thereof.

As a result of the large surfaces of the sodium—argon interfaces in the upstream tank 144 and downstream tank 145, it is clear that levels N' and N'3 vary to a relatively limited extent in the case of a sodium—water reaction in the exchange zone of the generator. The argon pockets ensuring the damping or absorbing of the shocks in tanks 144, 145 can therefore be completely arranged above and below the bundle of tubes and consequently the bends thereof, in such a way that the damping of the pressure waves induces no large shocks on the bundle of tubes and consequently on the expansion bends.

In view of the fact that the sodium contained in the upstream buffer tank 144 communicates with the sodium contained in the downstream buffer tank and that there is a displacement of several meters between levels N' and N'3, the argon pocket 176 of the downstream buffer tank must have a pressure well above that of the pocket 168 of the upstream buffer tank. Thus, the top of tank 178 is connected to a pressurized argon supply pipe 180. In the embodiment of FIG. 3, this pipe enters the steam generator envelope 150 through dome 152, along the axis of the envelope, and issues into a tube 182 having a larger cross-section, which is extended downwards along the envelope axis through core 162 and ferrule 164 and issues laterally into tank 145, just below the upper wall defined by sheet 174. The argon pressure established in this way in tank 145 can be approximately 1 bar relative, when the argon pressure in the remainder of the circuit and particularly in tank 144 is 0.5 bar relative.

The lower liquid sodium level N'3 in tank 145 is defined by a bubble tube 184, whose lower end is flush with the surface of the liquid sodium in the downstream buffer tank and whose upper end issues into the argon pocket 168 of the upstream buffer tank, above the level N' defined by overflow 137. During the pressurization of argon pocket 176 by pipe 180, the argon escapes through tube 184 into argon pocket 168 as soon as the liquid sodium surface in tank 145 drops to the level of the lower end of tube 184. In the embodiment of FIG. 3, tube 184 is arranged in tube 182, in such a way that the passage cross-section of the latter remains very small compared with the sodium—argon surface in tank 145, contrary to what is shown in the drawing in order to improve the clarity thereof. The damping of a pressure wave resulting from a sodium—water reaction in the generator consequently takes place without any sodium rise in tube 182.

Finally, in the embodiment shown in FIG. 3, it is possible to see that there is a passage or annular space 186 between the outer wall of tank 145 defined by sheet 174 and the bottom 154 of the envelope. This sheet is hung on the central body 162, about which can be helically wound the bundles of tubes 169. Thus, there is a limited secondary sodium branch flow into space 186 and therefore into the annular space surrounding ferrule 164 above tank 145 and containing the expansion bends 172, as indicated by the arrows in FIG. 3. FIG. 3 also shows pipe 130 equipped with bursting disks 128.

Figure 4:
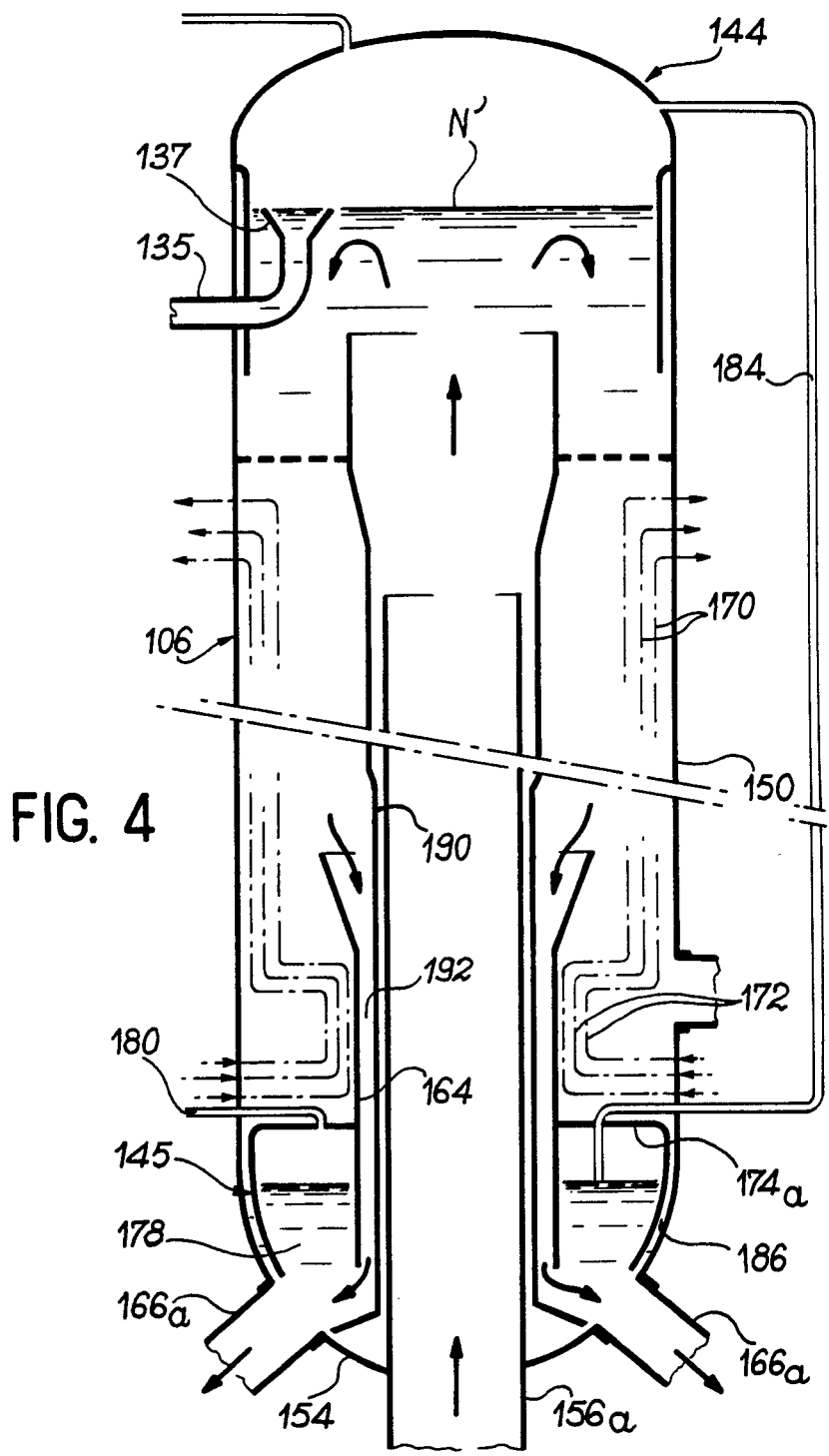
FIG. 4 a view comparable to FIG. 3 illustrating a variant in which the sodium enters through the bottom of the steam generator.
Figure 5:
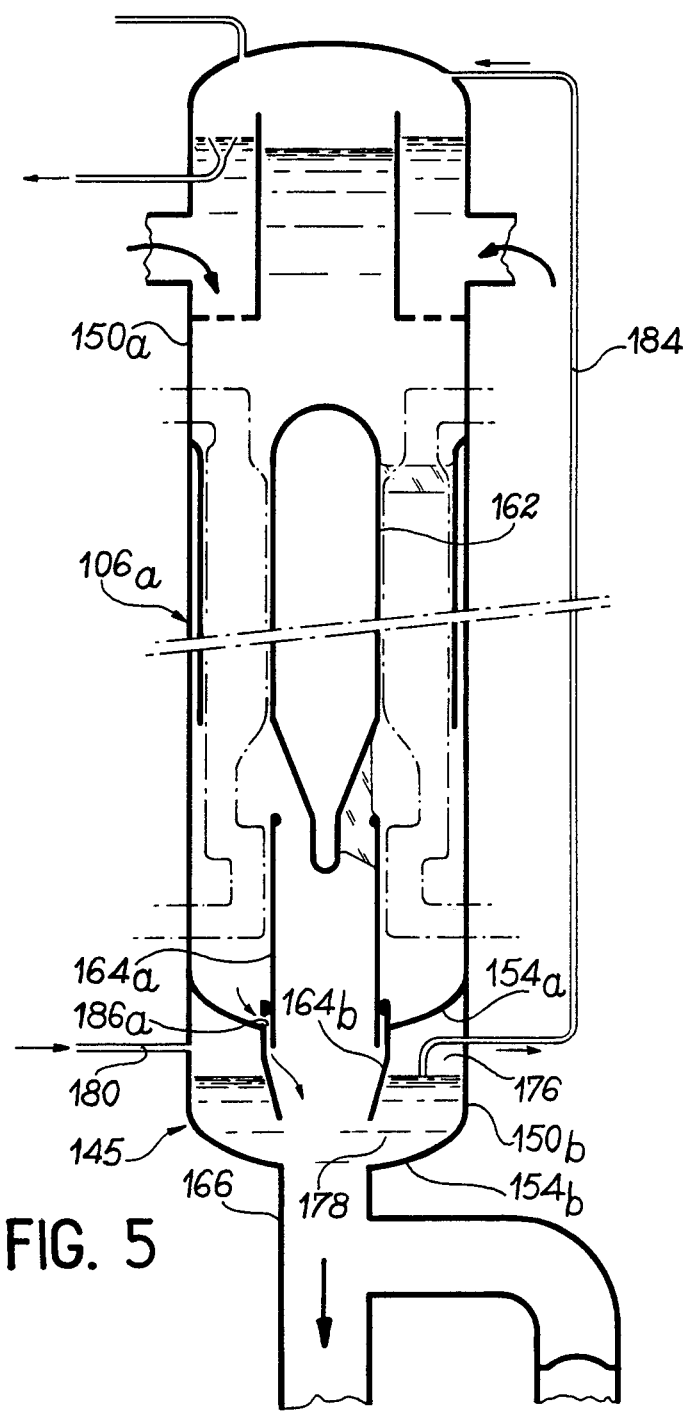
FIG. 5 a view comparable to FIG. 3 illustrating a variant in which the downstream buffer tank is installed on an existing generator.

The other embodiments of the steam generators shown in FIGS. 4 to 6 are identical to that described hereinbefore, with the exception of the following points.

In FIG. 4, the secondary sodium enters from the bottom of the generator by means of an intake tube 156a passing through the bottom 154 of envelope 150 along the axis of the latter. Tube 156a is extended within the generator by a vertical stack 190, which is widened at its upper end and which issues well below the sodium level N' defined in the upstream buffer tank 144 by overflow 137. After flowing from bottom to top within stack 90, the sodium drops down again into the annular space defined between said stack and envelope 150. At this level and as in the preceding embodiment, it transfers part of the heat carried by it to the water circulating from bottom to top in the helical heat exchange zone 160 of the tubes. It then enters an annular space 192 of reduced cross-section, defined between stack 190 and ferrule 164 and then flows downwards to the discharge tubes 166a, arranged obliquely in envelope bottom 154. As in the preceding embodiment, ferrule 164 extends over the entire height of the expansion bends 172 and is extended below the horizontal upper wall of tank 145, formed by a sheet 174a, in order to define the inner wall of said annular tank.

The lower end of ferrule 164 is located at a certain distance from bottom 154, in order to permit the flow of sodium to discharge tubes 166a and to link the bottom of tank 145 with this flowing sodium.

This arrangement makes it possible to reduce the length of the outgoing pipe 108, because in general the lower part of steam generator 106 is substantially at the same level as the upper part of exchangers 104, which cannot be shown in FIG. 2 for practical reasons. By making free the upper part of steam generator 106, this arrangement also makes it possible to separate the frequencies inherent in the latter from those transmitted to pipe 108 in the case of an earthquake.

The steam generator shown in FIG. 5 illustrates the application of the invention to an existing generator. Thus, in this case, the upper wall of the downstream buffer tank 145 is constituted by the bottom 154a of a first part 150a of the generator envelope, containing all the elements of the latter, with the exception of buffer tank 145. The outer side wall of tank 145 is constituted by a cylindrical wall 150b extending wall 150a in a downwards direction and also having a bottom 154b, at the centre of which issues discharge tube 166. Moreover, a ferrule 164b is sealingly connected to the lower end of ferrule 164a, by which the liquid sodium flows downwards into the lower portion of envelope part 150a. This ferrule 164b is extended beneath bottom 154a and consequently defines the inner side wall of tank 145. Obviously, its lower end terminates at a certain distance from bottom 154b, in order to permit the sodium contained in the downstream buffer tank to be linked with the sodium flowing in the discharge area of the steam generator.

In this embodiment and in view of the fact that the outer wall of tank 145 is constituted by envelope part 150b, a limited liquid sodium flow within the annular space defined around ferrule 164a and above tank 145 is obtained by means of passages 186a, formed in ferrule 164a just above bottom 154a. Thus, a limited sodium circulation is established around the expansion bends.

FIG. 5 also shows that the bubble tube 184 as well as the tube 180 for pressurizing the argon pocket 176 are positioned, as in FIG. 4, outside the steam generator envelope.

Obviously, variations can be made to these different embodiments, or they can be combined with one another without passing beyond the scope of the invention. In all cases, the advantages resulting from the arrangement of the downstream buffer tank within the steam generator, the large surface of the sodium—argon interface within said tank and the arrangement of the argon pocket defined by this tank at a level which is displaced relative to the expansion bends of the tubes are retained. The mechanical pump 112 described relative to FIG. 2 can be replaced by one or more pumps of another type, e.g. electromagnetic pumps, without passing beyond the scope of the invention.

We claim:

1. A secondary heat transfer circuit for a liquid metal-cooled nuclear reactor, comprising at least one heat exchanger located in the reactor vessel, a vertical steam generator outside said vessel, an outgoing pipe connecting an outlet tube of each heat exchanger to at least one intake tube of the steam generator, a return pipe connecting at least one outlet tube of the steam generator to an inlet tube of each heat exchanger, a pump for circulating a secondary liquid metal contained in said circuit and positioned in the return pipe, an upstream buffer tank and a downstream buffer tank disposed in said circuit respectively upstream and downstream of the exchange area of the steam generator, and a storage tank for the secondary liquid metal which can be linked with the remainder of the circuit, the steam generator having an outer envelope within which is arranged the upstream buffer tank, the latter defining a first free liquid metal level surmounted by a first neutral gas pocket above the exchange zone in the upper part of the envelope, wherein the downstream buffer tank is also arranged inside the outer envelope and defines a second free metal level surmounted by a second neutral gas pocket, said downstream buffer tank having an annular configuration and being positioned below the exchange zone, around an outlet zone from the generator by which the secondary liquid metal flows downwards between the exchange zone and the outlet tube of the steam generator, the downstream buffer tank communicating with said outlet zone, means being provided to establish a first neutral gas pressure above the secondary free liquid metal level in the downstream buffer tank, and means being provided for establishing a second neutral gas pressure, below the first neutral gas pressure, in simultaneous manner in the storage tank and in the upstream buffer tank.

2. A circuit according to claim 1, wherein the circulating pump is a mechanical axial suction pump having a pump barrel and a motor controlling the rotation of a rotor in the pump barrel via a vertical shaft traversing a hydraulic packing integral with the pump barrel, the secondary liquid metal defining a free level surmounted by a neutral gas covering in that part of the pump barrel above the packing, said neutral gas covering being linked to means for establishing the second neutral gas pressure.

3. A circuit according to claim 2, wherein the circuit then also comprises means for regulating the level of the secondary liquid metal in the pump barrel, said regulating means incorporating a supply pipe connecting the storage tank to the return pipe upstream of the main pump, a discharge pipe connecting an overflow formed in the pump barrel above the hydraulic packing to the storage tank, and means for permanently circulating the secondary liquid metal in said supply and discharge pipes, in order to be able to operate with a permanent secondary liquid metal leak through the hydraulic packing of the pump to the storage tank.

4. A circuit according to claim 3, wherein the means (119) are constituted by an electromagnetic pump.

5. A circuit according to claim 1, wherein the circulating pump is an electromagnetic pump.

6. A steam generator for use in a secondary heat transfer circuit according to claim 1, this generator is of the type having a vertically axed outer envelope, at least one inlet tube and at least one outlet tube for the secondary liquid metal, the space defined within the envelope being subdivided into a liquid metal intake zone communicating with the inlet tube, a liquid metal discharge zone communicating with the outlet tube and an exchange zone in which the secondary liquid metal circulates from top to bottom around the tertiary water circulating tubes between the intake zone and the discharge zone, the generator also having an upstream buffer tank formed by a first neutral gas pocket filling the upper end of the enclosure, wherein it also comprises an annular downstream buffer tank, positioned below the exchange zone and communicating with the discharge zone by at least one opening formed at the lower end of its inner partition and whose tight upper part is filled with a second neutral gas pocket.

7. A generator according to claim 6, wherein the discharge zone is defined within a ferrule, arranged coaxially in the lower part of the outer envelope, the downstream buffer tank being positioned around the ferrule in such a way that the lower part thereof forms the internal partition of said tank, the lower end of the ferrule terminating at a given distance from the bottom of the envelope in order to define said opening.

8. A generator according to claim 7, wherein the intake tube opens into the upper part of the envelope and the discharge tube opens into the bottom of the envelope, in the extension of said ferrule.

9. A generator according to claim 7, wherein the intake tube opens into the bottom of the envelope and coaxially to the latter, the intake zone having a central stack communicating with the intake tube and in which the secondary liquid metal circulates from bottom to top in order to enter the upper part of the envelope, the ferrule being disposed around the central stack in order to define with the latter an annular passage defining the discharge zone, the discharge tube opening into the bottom of the envelope, in staggered manner with respect to the intake tube.

10. A generator according to claim 7, wherein an annular passage is defined between the outer partition of the downstream buffer tank and the envelope, in such a way that there is a limited circulation of secondary liquid metal in the annular space defined around the ferrule and above the downstream buffer tank.

11. A generator according to claim 7, wherein the ferrule has at least one passage above the upper partition of the downstream buffer tank, in such a way that there is a limited circulation of secondary liquid metal in the annular space defined around the ferrule and above the downstream buffer tank.

* * * * *